United States Patent

Smith

(10) Patent No.: US 8,299,721 B2
(45) Date of Patent: Oct. 30, 2012

(54) SYSTEMS AND METHODS FOR RULES BASED, AUTOMATED LIGHTING CONTROL

(75) Inventor: Derek Matthew Smith, San Diego, CA (US)

(73) Assignee: Telsa Controls Corporation, San Diego, CA (US)

( * ) Notice: Subject to any disclaimer, the term of this patent is extended or adjusted under 35 U.S.C. 154(b) by 523 days.

(21) Appl. No.: 12/481,517

(22) Filed: Jun. 9, 2009

(65) Prior Publication Data

US 2009/0302782 A1 Dec. 10, 2009

Related U.S. Application Data

(60) Provisional application No. 61/131,536, filed on Jun. 10, 2008.

(51) Int. Cl.
*H05B 37/02* (2006.01)

(52) U.S. Cl. ......... 315/291; 315/294; 315/315; 315/316

(58) Field of Classification Search .................. 315/291, 315/292, 293, 312, 294, 295, 297, 307, 308, 315/313, 314, 315, 316–322
See application file for complete search history.

(56) References Cited

U.S. PATENT DOCUMENTS

| | | | | |
|---|---|---|---|---|
| 2005/0001563 A1* | 1/2005 | Logan | ............................ | 315/291 |
| 2005/0253538 A1* | 11/2005 | Shah et al. | ..................... | 315/362 |
| 2009/0261734 A1* | 10/2009 | Newman, Jr. | ................. | 315/129 |

* cited by examiner

*Primary Examiner* — David Hung Vu
(74) *Attorney, Agent, or Firm* — Procopio Cory Hargreaves & Savitch LLP; Noel C. Gillespie

(57) ABSTRACT

A lighting control system comprising a plurality of intelligent switches designed to replace a conventional light switch, each of the intelligent switches including a receiver configured to receive communication signals that include rules based instructions for controlling one or more lighting circuits; a circuit interrupter configured to control the amount of current flowing to a lighting circuit; a memory configured to store the rules based instructions; and a processor coupled with the receiver, memory, and circuit interrupter, the processor configured to control the operation of the circuit interrupter based on the rules based instructions stored in memory.

16 Claims, 5 Drawing Sheets

SYSTEMS AND METHODS FOR RULES BASED, AUTOMATED LIGHTING CONTROL

RELATED APPLICATIONS INFORMATION

This application claims priority under 35 U.S.C. 119(e) to U.S. Provisional Application Ser. No. 61/131,536, filed Jun. 10, 2008 and entitled "Wireless Lighting Control System," which is incorporated herein by reference in its entirety.

BACKGROUND

1. Technical Field

The embodiments described herein are directed to systems and methods for automated lighting control, and more particularly to rules based, automated lighting control that uses wireless networks to propagate and implement rules based control of lighting systems.

2. Related Art

In, e.g., commercial buildings, lights are often left on after hours, or when no one is in a particular room. This practice waste electricity and causes premature bulb burn out, both of which lead to increased operating costs, as well as a host of other negative effects. Central control systems have been proposed an implemented that attempt to automate lighting control in order to mitigate this problem. Such systems often make use of time of day control, motion sensors, or both.

Time of day control can, for example, control the lighting system such that lights are scheduled to go off at a certain time in the evening and come back on at a certain time the next morning. Motion sensors can be configured such that they cause the lights in a particular room to go off when no motion has been detected in the room for a certain period of time, and to come back on once motion is detected.

Unfortunately, these conventional solutions suffer several problems that limit their effectiveness, convenience, or both. For example, time of day controls do not effectively, or efficiently accommodate the need to use the lights after the programmed shut off time. For example, in a large office building, employees of a certain tenant company, such as a law firm, may need to work late into the evening. This requires arrangements to be made to override the time of day controls, which can be inconvenient; moreover, if such arrangement are not made ahead of time, then it can be difficult to get the lights turned back on to accommodate the late working crew.

Motion sensors will often cause the lights in a room to go off even when the room is occupied if the occupant is still for an extended period of time, for example, typing at their desk. This again can be inconvenient, especially if it occurs repeatedly.

Another problem is that these conventional systems require a costly and time consuming re-wiring of the electrical system.

Still another problem is that such systems do not address the need to find and replace burnt out bulbs. In a large complex, their can be numerous undetected, at least by maintenance personal, burnt out light bulbs. This reduces the overall effectiveness of the lighting system and once again can be inconvenient.

SUMMARY

A rules based automated lighting control system provides an efficient and effective means for controlling lighting in a building, such as a commercial building, that can reduce electricity consumption, can provide detection of burnt out light bulbs, load shedding, redundancy, and other advantages, and that does not require a costly re-wiring to install.

According to one aspect, a lighting control system comprises a plurality of intelligent switches designed to replace a conventional light switch, each of the intelligent switches including a receiver configured to receive communication signals that include rules based instructions for controlling one or more lighting circuits; a circuit interrupter configured to control the amount of energy flowing to a lighting circuit; a memory configured to store the rules based instructions; and a processor coupled with the receiver, memory, and circuit interrupter, the processor configured to control the operation of the circuit interrupter based on the rules based instructions stored in memory.

According to another aspect, A lighting control system, comprises a plurality of intelligent switches each designed to replace a conventional light switch, each of the intelligent switches including a receiver configured to receive communication signals that include rules based instructions for controlling one or more lighting circuits, a circuit interrupter configured to control the amount of current flowing to a lighting circuit, a memory configured to store the rules based instructions, and a processor coupled with the receiver, memory, and circuit interrupter, the processor configured to control the operation of the circuit interrupter based on the rules based instructions stored in memory; and a gateway, the gateway including a first transceiver configured to communicate with a remote server in order to receive rules based instructions for control of a plurality of intelligent switches, and a transmitter configured to transmit the rules based instructions to the plurality of intelligent switches.

These and other features, aspects, and embodiments are described below in the section entitled "Detailed Description."

BRIEF DESCRIPTION OF THE DRAWINGS

Features, aspects, and embodiments are described in conjunction with the attached drawings, in which.

DETAILED DESCRIPTION

The systems and methods described below disclose various embodiment of a system configured to control the operation of various lighting circuits through rules based instructions. In order to achieve such control in a reliable and efficient manner, the rules based instructions are downloaded to a plurality of intelligent switches coupled with the lighting circuits to be controlled.

The intelligent switches are designed to replace conventional light switches or controls. It will be understood that a conventional light switch controls one or more lighting circuits. Each lighting circuit can include one or more light fixtures, or one or more light bulbs. Light switches are obviously manual control devices. In other words, all of the light bulbs in a particular lighting circuit are turned on or off via the associated light switch. Although it will also be understood that certain light fixtures can have an independent control, e.g., on/off switch, such that they can be turned off, even though the light switch controlling the associated lighting circuit is on. It will also be understood that certain light controls can do more than simply turn the lighting circuit on or off, for example, a dimmer can set the light bulbs to an intermediate level.

Thus, an intelligent light switch can control the lighting circuits in the same manner, e.g., on, off, intermediate setting, but instead of being controlled purely by a manual control, an intelligent light switch controls operation of the associated lighting circuits based on a set of rules based instructions downloaded to the switch.

Downloading the rules based instructions to the intelligent switches can improve robustness because it allows remote control of the lighting system, but limits the amount of data that needs to be transmitted back and forth in order to achieve that control. As explained in more detail below, the intelligent switches are essentially nodes on a network. One or more of the nodes can be unavailable for communication for a variety of reasons. Accordingly, if data needs to be continuously communicated within the system, then the system will not work when one or more of the nodes are unavailable. The amount of data that needs to be communicated can be kept to a minimum by downloading the rules based instructions.

Figure 1:
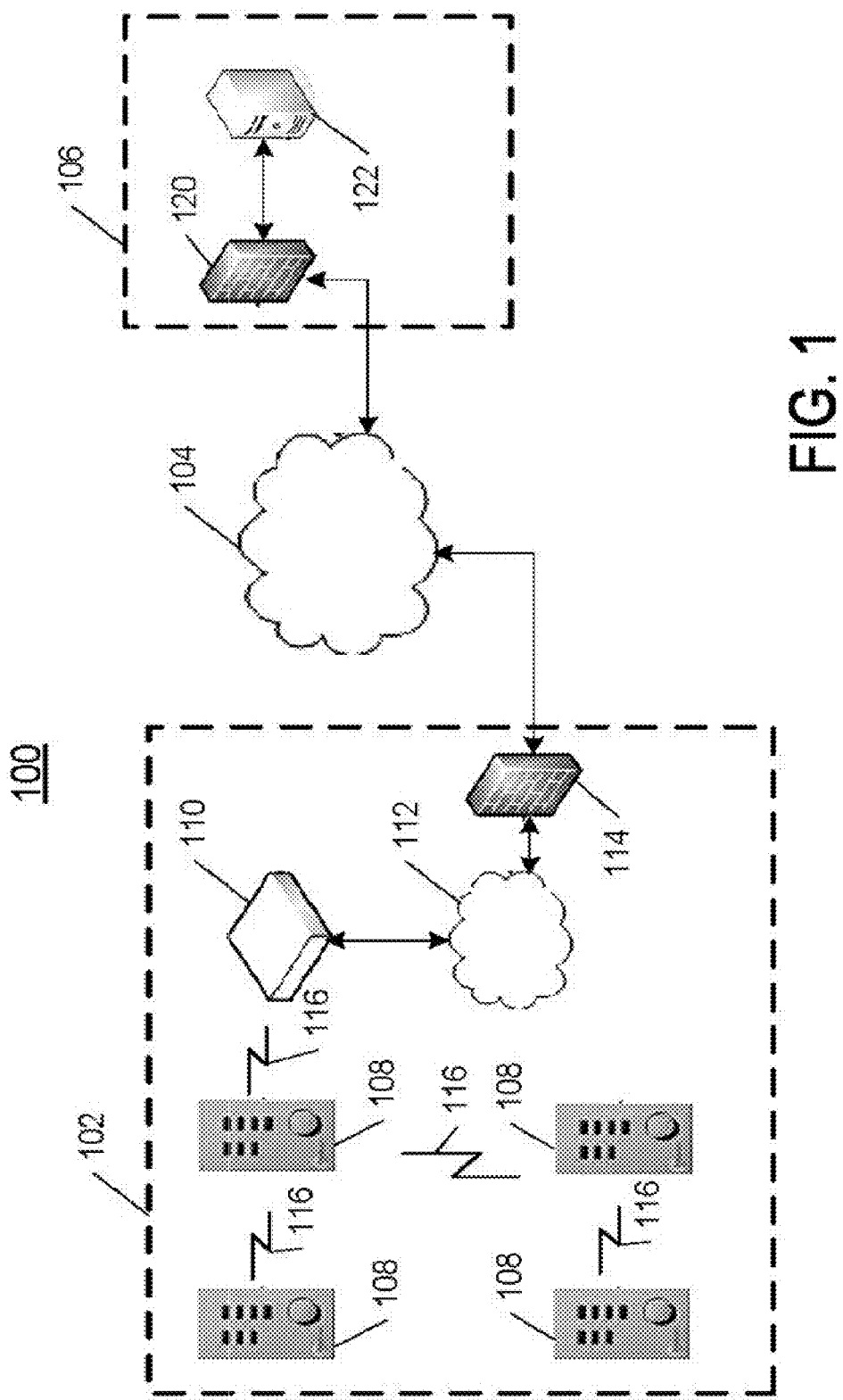
FIG. 1 is a diagram illustrating an example lighting control system configured in accordance with one example embodiment.

FIG. 1 is a diagram illustrating an example lighting control system 100 configured in accordance with one example embodiment. As can bee seen, the components of system 100 are spread across the facility 102, in which the lighting system being controlled resides, and a hosted facility 106. As will be explained in more detail below, facility 102 and hosted facility 106 can be communicatively coupled via a network or networks 104, e.g., including the Internet. A plurality of intelligent switches 108 can be installed within facility 102. The plurality of intelligent switches can be communicatively coupled with a gateway 110, which in this example is communicatively coupled with a control authority 122 in hosted facility 106 via a local network 112 and network 104. Firewalls 114 and 120 can also be included as illustrated.

Authority 122 can be configured to control the configuration for the entire system 100 and can allow a user or administrator to change the operation of the system. Authority 122 can comprise the hardware and software needed to perform the functions described below. Thus, authority 122 can comprise one or more processors, one or more servers, one or more routers, one or more software API's, one or more databases, one or more user interfaces, one or more software routines, etc. Moreover, these components can be integrated into a single device, or distributed within or without of facility 106. For example, a server included in authority 122 and located in hosted facility 106 can be interfaced with a remote database that is also part of authority 122.

In one example implementation, authority 122 can comprise a server that includes one or more computing cores; volatile storage, such as Random Access Memory (RAM), for storing non-critical data; non-volatile memory, such as a hard disk, for storing system critical data and programming; a network interface, such as a Gigabit Ethernet interface, for communicating over network 104; an oscillator; and a power supply. It will be understood that other components can be included or may be necessary for proper operation. Thus, the above components are intended to be illustrative and not exhaustive. Such a server can be configured to run on a Linux operating system and use a piece of software called a Servlet Container, such as that offered through the open source Apache Tomcat project.

In certain embodiments, authority 122 can comprise multiple similarly configured servers. In this manner, authority 122 can achieve redundancy and load balancing. For example, when a gateway 110 communicates with one of the servers, the server can direct the gateway to communicate with a second server that is less busy. Further, authority 122 can comprise several servers performing various functions. For example, one server can be configured to handle all incoming requests from gateways 110, while another server is configured to handle all incoming requests from any software/user interfaces, and still another is configured to handle all database functions; however, in such embodiments, each server can be configured to perform the functions of the others for redundancy.

As explained in more detail below, authority 122 can be configured to place intelligent switches 108 on a map of facility 102 and associate them with a particular room that the switch controls; define which users can change system settings and operation; update firmware with switches 108; configure rules for system operation; view current status for each room within facility 104, e.g., whether the lights are on or off, how long they have been on, and the amount of current flowing through the associated switch 108; configured alerts, e.g., based on the amount of current flowing through as switch 108; store baseline load information for each switch 108; and communicate load information to a separate system.

Firewall 120 can also be included within authority 122. The operation of firewall 120 is well known and will not be described in detail here.

Intelligent switches 108 and gateway 110 reside within facility 102. Gateway 110 can act to bridge the switches 108, which are interfaced using one network, with another network 112 that can then be interfaced either directly with authority 122 or interfaced with authority 122 through another network, such as network 104. For example, in the embodiment illustrated, Gateway 110 interfaces switches 108 with a wired Local Area Network 112. Thus, Gateway 110 can pass data between the, e.g., wireless network that includes switches 108 and a wired network 112. In one implementation, gateway 110 can be a ZigBee to Ethernet gateway.

In other embodiments, network 112 can also be a wireless network, such as a wireless LAN configured to implement the, e.g., IEEE 802.11 standard, or a wireless Metropolitan Area Network (MAN) configured to implement the, e.g., WiMax or IEEE 802.16 standard. In general, network 112 can comprise one or more wired or wireless LANs, one or more wired or wireless MANs, one or more wired or wireless Personal Area Networks (PANs), or some combination thereof.

Gateway 110 can be configured to act as a firewall between the network that includes switches 108 and network 112. Where network 104 is also included, then a second firewall 114 can also be included.

Gateway 110 can be configured to perform several other functions as well. For example, gateway 110 can be configured to store configuration data for switches 108 and can also perform network maintenance functions. Gateway 110 can also be configured to act as the coordinator for the network that includes switches 108.

For example, gateway 110 and switches 108 can form a wireless mesh network. Mesh networking is a way to route data, voice and instructions between nodes. It allows for continuous connections and reconfiguration around broken or blocked paths by "hopping" from node to node until the destination is reached. A mesh network whose nodes are all connected to each other is a fully connected network. Mesh networks differ from other networks in that the component parts can all connect to each other via multiple hops, and they generally are not mobile. Mesh networks are self-healing: the network can still operate even when a node breaks down or a connection goes bad. As a result, mesh networks are very reliable.

Wireless mesh networks is a common application of mesh architectures. Thus, switches 108 and gateway 110 can be communicatively coupled via wireless communication links 116. If one of the nodes, i.e., switches, goes off line, then links 116 can be rearranged such that the other switches 108 can still communicate with gateway 110 by avoiding the downed node. This is an important feature than can increase the reliability and performance of system 100.

As mentioned above, another way to increase reliability and performance is to limit the amount of data that needs to be communicated. Accordingly, these two approaches, i.e., limited data transfer and mesh networking, can significantly improve the performance and reliability of system 100.

In one implementation, the Zigbee protocol is used to implement the wireless mesh network within facility 102. Further, in certain implementations, gateway 110 can be included in one of switches 108, or even distributed across several switches 108; although this increases the complexity.

Figure 2:
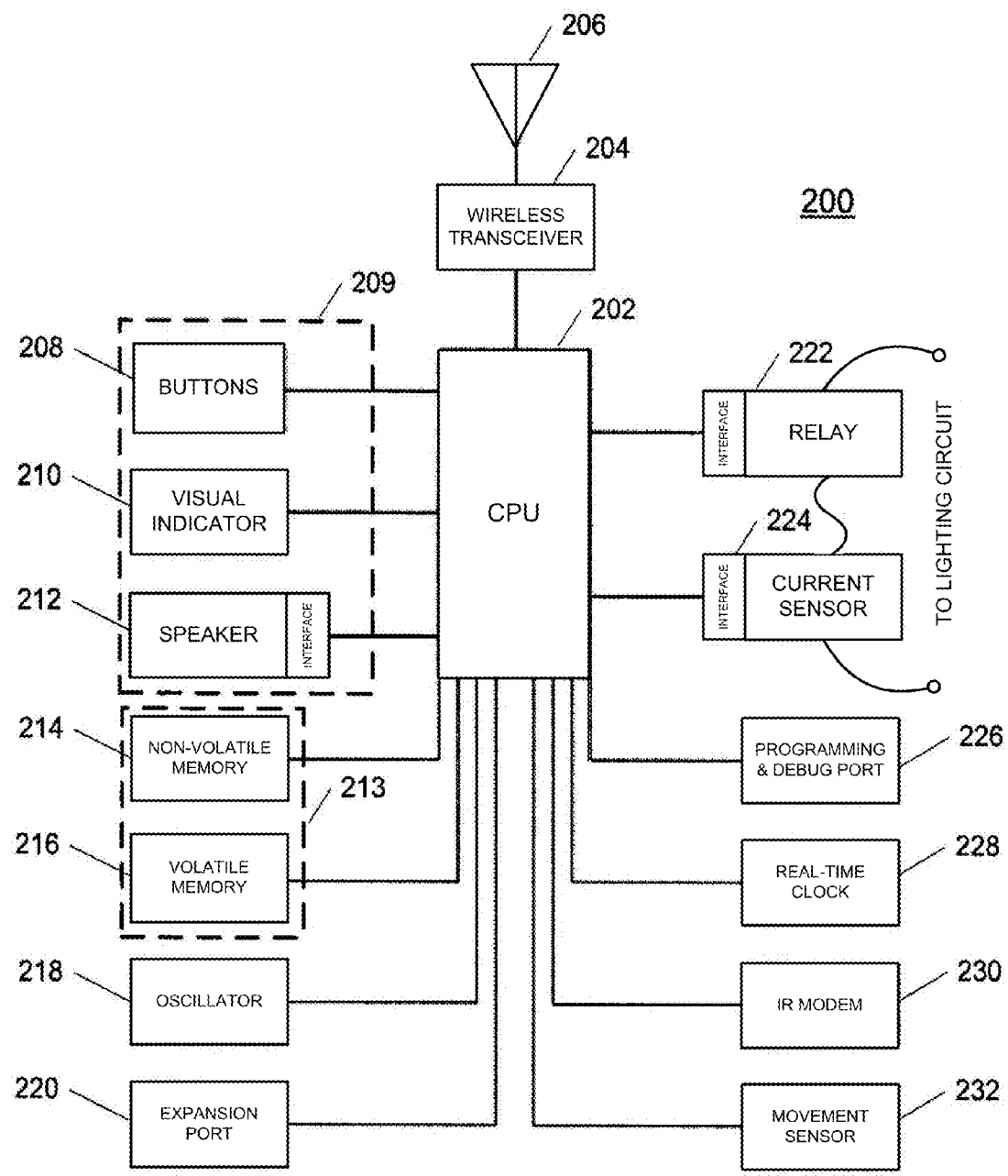
FIG. 2 is a diagram illustrating an example embodiment of an intelligent switch that can be included in the system of FIG. 1 in accordance with one embodiment.

FIG. 2 is a diagram illustrating an example embodiment of an intelligent switch 108 in accordance with one embodiment. As can be seen, in the example of FIG. 2, an intelligent switch 108 can comprise a processor 202, such as a Central Processing Unit (CPU), a micro-processor, a digital signal processor, or other processor, or some combination thereof. Processor 202 can be coupled with wireless transceiver 204, which in turn can be coupled with an antenna 206. Intelligent switch 108 can also comprise manual inputs 208, visual indicator 210, and speaker 212, each interfaced with processor 202. Intelligent switch 108 can also comprise non-volatile memory 214 and volatile memory 216, oscillator 218, expansion port 220, programming and debugging port 226, real time clock 228, IM modem 230, and movement sensor 232. Intelligent switch 108 can also include a circuit interrupter 222 and a current sensor 224 interfaced with a lighting circuit (not shown).

While not shown, intelligent switch 108 can also comprise a power supply. Such a power supply can be configured to confer line AC power to a lower voltage in order to power the circuits and components illustrated in FIG. 2. For example, the power supply can comprise a regulator such as a switching buck regulator, which is a type of power supply that is well known and therefore will not be explained in detail here.

The power supply can be configured to output multiple voltages for use by the circuits and components included in intelligent switch 108. For example, such a power supply can be configured to generate +3.3V output as well as a +12 V output. The +3.3V output can be used to power the digital circuits and logic included in intelligent switch 108, while the +12V output can be used for relay and current sensors 212 and 224. Such a power supply can be configured to transform voltages over a range such as 100V AC to 277V AC.

As mentioned, processor 202 can comprise one or more CPUs, one or more micro-processors, one or more digital signal processors, as well as other processors such as math co-processors, etc. It will be understood that these different processing cores can be packaged as a single circuit or can be included as multiple circuits depending on the implementation. Processor 202 can be configured to control the operation of intelligent switch 108 based on instructions stored in memory. As explained below, processor 202 can also be configured to control the operation of intelligent switch 108 based on manual inputs and information from current sensor 224, real time clock 228, and movement sensor 232. The instruction stored in memory can include rules based instructions that dictate how processor 202 controls a lighting circuit (not shown) interfaced with processor 202 through relay 222. Such instructions can be downloaded through transceiver 204 and stored, e.g., in a non-volatile memory 214. As such, the rules based instructions can be periodically updated and changed as will be explained in more detail below. Processor 202 can also be configured to send data to gateway 110 and ultimately, to authority 122 via transceiver 204. For example, processor 202 can be configured to send current load information as determined using current sensor 224 to authority 122.

In one example implementation, processor 202 is a Texas Instruments MSP 430 micro-controller. Such a micro-controller can be pre-programmed with a unique identifier (ID). This unique ID can be used to identify the particular intelligent switch 108 when there are multiple switches 108 communicating over the mesh network within facility 102. No two switches 108 should be programmed with the same ID. An example ID is that Media Access Controller (MAC) address as defined by the IEEE standard 802.15.4.

Transceiver 204 can, as described above, transmit and receive data via the wireless mesh network included in facility 102. Transceiver 204 can be configured to receive information from other switches 108, gateway 110, or both. In certain embodiments, transceiver 204 may in fact only be a receiver configured to receive, e.g., rules based instructions that define the operation of intelligent switch 108. In one implementation, transceiver 204 is the XBee® ZNet 2.5 OEM RF module from Digi International. In other implementations, transceiver 204 can be integrated with processor 202.

Intelligent switch 108 can also comprise a user interface 209. In one embodiment, user interface 209 can include manual inputs 208, visual indicator 210, and speaker 212. Manual inputs 208 can be used to control the operation of intelligent switch 108. Thus, the manual inputs 208 can be used to override the rules based instruction stored in memory, or to work in conjunction with the rules based instructions. Manual inputs 208 can comprise push buttons, switches, or sliding control mechanisms. Based on the configuration of switch 108, changing the state of the manual inputs can change the behavior of switch 108, i.e., how switch 108 controls the lighting circuit or circuits interface with intelligent switch 108, or can cause certain data to be sent to authority 122. For example, push buttons can be included in user interface 209 where each push button represents a lighting preset. Thus, when one of the push buttons is activated, the state of one or more circuit interrupters 222 will change according to the preset associated with that push button. Similarly, sliders or switches can also be associated with certain presets. For example, one preset may be to turn all lights on the lighting circuit off, to turn some lights on the lighting circuit on and some off, or to transition at least some lights on the lighting circuit to a level that is in between on and off, i.e., dim the lights.

User interface 209 can also include a visual indicator 210. Visual indicator 210 can be configured to communicate the current state of programming to a user. For example, multiple LEDs can be included in order to indicate various states of switch 108. The LEDs can be of different colors and can be used to indicate both normal conditions and false conditions. For example, the LEDs may indicate the presence of AC power, the presence of the converted power levels, e.g., +12V and +3.3V; circuit interrupter status; strength of signal received on transceiver 204 status; wireless mesh network activity; and errors. In other implementations, visual indicator 210 can comprise of display such as a LCD display.

User interface 209 can also include a speaker 212, which can be used to alert a user audibly when the state of operation is changing.

Intelligent switch 108 can also comprise memory 213. Memory 213 can comprise one or more memory components such as non-volatile memory 214 and volatile memory 216. A non-volatile memory 214 retains its contents regardless of whether or not it is powered up. This is useful for storing settings and programs that must be retained when the device is without power. Thus, non-volatile memory 214 can be used to store configuration parameters and programs for use by processor 202. These can include the rules based instructions created in authority 122 and downloaded to intelligent switch 108 via gateway 110. Non-volatile memory can comprise flash memory, Electrically Erasable Programmable Read Only Memory (EEPROM) or hard disk. Non-volatile memory 214 can be external to processor 202, internal, or both. For example, in one implementation part of non-volatile memory 214 is integrated with processor 202 and part of non-volatile memory 214 is external to processor 202, such as in an external integrated circuit interfaced with processor 202.

Memory 213 can also comprise volatile memory 216, which can be configured to only retain its contents while powered up. Volatile memory 216 is often used for temporary storage of items such as configuration parameters that will not harm the system if lost. Volatile memory 216 can comprise random access memory such as Dynamic Random Access Memory (DRAM) or Static Random Access Memory (SRAM), or DDR RAM. Volatile memory 216 can also be external to processor 202, internal, or both. For example, in one implementation volatile memory 216 is integrated with processor 202.

It will be understood that the components that comprise memory 213 can be integrated as one component or can be included as multiple components, such as multiple integrated circuits, one or more integrated circuits and a hard drive, etc.

Intelligent switch 108 can also comprise several ports, such as expansion port 220 and programming and debugging port 226. With respect to expansion port 220, it is often the case that multiple light switches are used to control lights within a room or small areas. The switches are often located in close proximity. Each one of these light switches is then used to control separate lighting circuits. It can be preferable to replace these light switches with a single intelligent switch 108 for several reasons, such as lower costs and less radio frequency interference. Accordingly, switch 108 can have one or more expansion ports that can be configured to allow a single switch to control multiple lighting circuits. In certain embodiments, additional expanders (not shown) can be interfaced with intelligent switch 108 through expansion port 220. An expander (not shown) can be a scaled-down version of an intelligent switch 108. Such an expander, e.g., may not have a processor 202, memory 213, or transceiver 204. But, such an expander can have its own user interface 209; relay 222, by which it can control an associated lighting circuit; and current sensor 224.

The connection between switch 108 and such an expander can either be a simple connection, whereby individual signals control individual aspects or functions in the expander, or it can use serial communication to allow greater flexibility. The expander can be powered by different power supply from that being used by the associated switch 108, and thus, it will be desirable to isolate the two devices electrical systems, e.g., using opto-isolators. Thus, for example, the interface between switch 108 and such an expander can be an optically isolated serial communication interface.

Some operations, like changing the state of a circuit interrupter 222, can require significant current. Accordingly, if both switch 108 and an associated expander are performing such an operation simultaneously, the current consumption can be greater than that capable of being provided by an associated power supply. To prevent this, switch 108 can be configured to control when each expander interface thereto perform such a function, e.g., switch 108 can be configured to wait a certain period before commanding such expanders to perform such an operation.

As with each switch 108, it can be preferable that each expander be programmed with a unique identifier, at least relative to other expanders interfaced with the same switch 108, so that the associated switch 108 can differentiate messages from each associated expander. In other embodiments, the expanders can include a transceiver and thus would need their own identifier.

Programming/debugging port 226 can be used to change the programming for processor 202. In certain embodiments, the programming can be changed remotely by authority 122; however, it can also be preferable to allow the programming to be updated locally at switch 108. Thus, programming/debugging port 226 can be included to allow a user to connect directly to switch 108. Updated programming, or firmware, can then be uploaded through port 226 and stored in memory 213. Programming/debugging port 226 can also be used for testing the operation of switch 108. For example, the levels of the digital signals from processor 202 can be converted to, e.g., RS-232 levels that can be sent to an external computer for debugging. In certain embodiments, programming/debugging port 226 can also be an optically isolated communication port.

In certain embodiments, it can be preferable to be able to communicate locally with switch 108 without the need to connect any wires, e.g., as with programming/debugging port 226. Accordingly, IR modem control port 230 can be included. This port can allow communication with intelligent switch 108 via infrared communication signal. For example, IR modem control port 230 can comprise an IRDA compliant transceiver, which is well known. IR modem control port 230 can then be controlled, e.g., using an Ir remote control, which can be configured to send signals to control the operation of intelligent switch 108. As explained below, facility 102 can include other devices, such as video projectors, configured for rules based control in addition to intelligent switch 108. Infrared control such as that provided by IR modem control port 230 can be particularly advantageous for such devices.

Real time clock 228 can be configured to keep track of the time of day. It can also be configured to keep track of the day of the week and dates. As will be explained below, the rules based instructions downloaded to each intelligent switch 108 will often include instructions related to the time of day. Thus, it is preferable that each switch 108 be able to determine the time of day independent of the rest of the system 100. This minimizes the amount of data that must be transmitted through system 100 and increases reliability and operational efficiency. Thus, real time clock 228 can be included in each switch 108 in order to provide the time of day information used in conjunction with the rules based instruction downloaded from authority 122 and stored in memory 213.

It can be preferable for an intelligent switch 108 to detect when someone enters the room or enclosure associated with the switch 108. Thus, movement sensor 232 can be incorporated into intelligent switch 108. Such a movement sensor 232 can be configured to detect the presence of someone within the associated room or enclosure. As such, movement sensor 232 can comprise an infrared emission sensor or an ultrasonic measurement sensor. As explained below, the operation of switch 108 can change depending on whether movement is detected. For example, if switch 108 is configured to turn off all lights at 11:00 p.m. via the rules based instruction stored in memory 213, such an instruction may be dependent on no movement being detected within the associated room for a certain period of time.

Circuit interrupter 222 and current sensor 224 are interfaced with processor 202 on one side and with an associated lighting circuit, or circuits (not shown) on the other. Circuit interrupter 222 can be configured to change the amount of current flowing through switch 108 to the lighting circuit based on the rules based instruction stored in memory 213. Depending on the embodiment, circuit interrupter 222 can be configured to act as a relay, e.g., with on and off control, or as a dimmer. In certain embodiments, circuit interrupter 222 will not be included in switch 108.

Current sensor 224 can be configured to measure the amount of current flowing through switch 108 to the associated lighting circuit. This information can, e.g., be used to determine if circuit interrupter 222 is functioning correctly or whether any of the lights on the associated lighting circuit have burnt out. This can be determined, e.g., by measuring changes in the amount of current flowing through switch 108. In certain embodiments, current sensor 224 can comprise a current transformer, but any sensor capable of measuring the current flowing to the associated lighting circuit and of being incorporated into switch 108 can be used.

In certain embodiments, other sensors such as temperature sensors or light sensors can also be included within switch 108. Such sensors can be used in order to determine the state of the room or enclosure with which switch 108 is associated. This information can then be used in conjunction, or to override the rules based instruction stored in memory 213. Further, a temperature sensor can be used to calibrate the performance of various circuits within switch 108. For example, current sensor 224 can be temperature sensitive. Thus, a temperature measurement obtained via a temperature sensor can be used to calibrate measurements obtained with current sensor 224 over a temperature.

It should be noted that separating processor 202 from transceiver 204 can reduce the likelihood that switch 108 will completely fail to operate due to some kind of failure; however, problems still will occur if both processor 202 and transceiver 204 are operating off the same power supply (not shown) and the power supply fails. For example, this can occur if there is a surge or brown out on the power line. In such situations, it can be preferable for switch 108 to be able to recover at least some operational functionality. To prevent such an occurrence from rendering switch 108 completely inoperable, switch 108 can have redundant power supplies, if one fails then the other takes over. Further, in certain embodiments separate power supplies can be used for transceiver 204 and processor 202.

Figure 3:
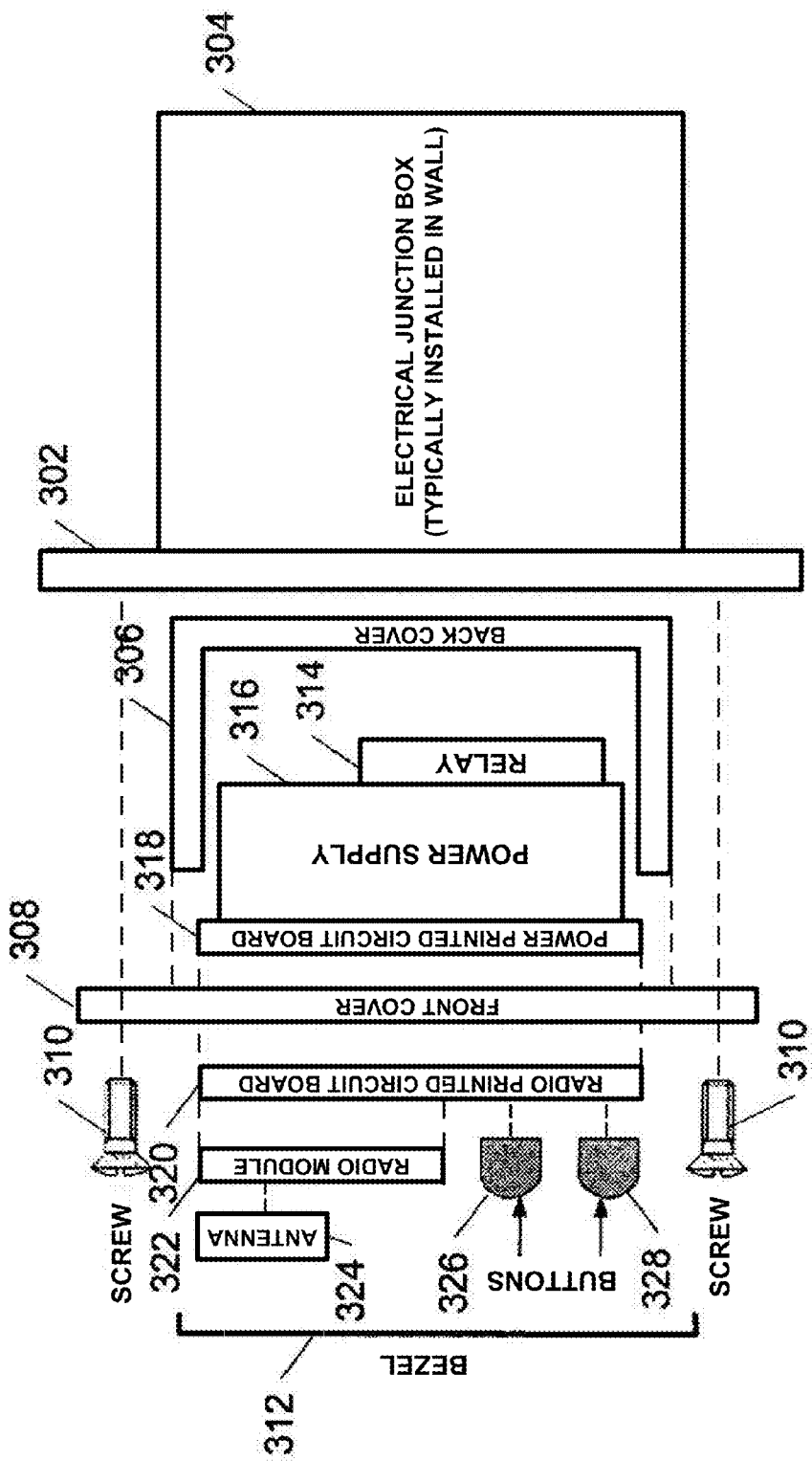
FIG. 3 is a diagram illustrating installation of the components comprising the switch of FIG. 2 into a standard electrical junction box, such as that used with standard light switch.

Installation of switch 108 will be described before describing the operation of switch 108. FIG. 3 is a diagram illustrating installation of the components comprising switch 108 into a standard electrical junction box, such as that used with standard light switch. As can be seen in FIG. 3, junction box 304 is mounted in a wall 302. A printed circuit board 318, comprising the circuits and components illustrated in FIG. 2, power supply 316, and circuit interrupter 314 are then installed within back cover 306. Front cover 308 then goes over back cover 306 and is attached to wall 302 via screws 310. A radio circuit board 320 with manual inputs 326 and 328 as well as radio module 322 and antenna 324 can then be mounted on the front of front cover 308 and enclosed by bezel 312.

The front cover, bezel, and back cover can be constructed of non-conductive materials for electrical safety, although part of the enclosure formed by these parts can be partially conductive to prevent electro-magnetic interference from radiating outward. The electrical connection to switch 108 can either be in the form of a terminal strip on the rear of the switch, or just loose wire protruding from the rear of the switch. In fact, in many embodiments the electrical connections are made by loose wires from the rear of the switch.

It will be understood that the construction and installation illustrated in FIG. 3 is by way of example only and that the example of FIG. 3 is not intended to limit the construction and installation in any way.

As noted above, the operation of switch 108 can be controlled according to a set of rules based instructions configured in authority 122 and downloaded to switch 108. The rules based instructions can change operations of switch 108 based on external inputs, e.g., received via user interface 209, or internal inputs, e.g., the time of day. For redundancy, it can be preferable to store the rules based instructions in switching units 108.

The rules based instructions can cause processor 202 to take one or more of the following actions: turn off local lighting circuits interfaced with switch 108, remote lighting circuits interfaced with any expanders interfaced with switch 108, or both; reduce the amount of power to a local or remote circuit, i.e., dim lights the local remote circuit; send data to authority 122; sound a buzzer; illuminate visual indicators; and send the signal to an external system, such as a ventilation system. It will be understood that the foregoing list is by way of example and is not intended to be exhaustive. Processor 202 can be instructed to take these actions in response to one or more of the following: the time of day, day of the week, or date; inputs from a manual input 208; instructions from authority 122; inputs from motion sensor 232; inputs from a hard wired AC switch; or room conditions such as temperature or light levels as detected or sensed by various sensor; or some combination thereof.

Thus, for example, the rules based instructions can cause processor 202 to turn off all or some associated lighting circuits at 11:00 p.m. each day: to beep for 30 seconds and if no manual input is activated, then turn off at least some of the associated lighting circuits at 10:00 p.m.; turn on one local circuit when a manual input is activated and turn on multiple local lighting circuits when a second manual input is activated; turn on one or more remote circuits when still another manual input is activated; turn off all circuits if no motion is detected for 20 minutes; and one hour after all lighting circuits are activated, beep for one minute and then turn off all lighting circuits. As can be seen, this set of sample instructions combines both external and internal inputs. Moreover, in certain instances external inputs can override programming based on the time of day or based on a certain time period.

As will be discussed in more detail below, a user or system administrator can define the rules of facility 102 through an access authority 122, or a server included therein. These rules can apply to the whole building, can apply on a floor-by-floor basis, can apply on a room-by-room basis, or even on a circuit-by-circuit basis, or some combination thereof. As a result, very granular lighting control can be implemented, which can reduce costs and increase comfort. Moreover, because the rules based instructions are downloaded to each switch 108, the system is reliable and can continue to operate even in the face of network or communication failures within system 100.

Moreover, the rules based instructions can even include instructions on a lamp-by-lamp basis. For example, it is common for commercial facilities to have a combination of both fluorescent lighting for normal use as well as incandescent lighting for specialty use. For example, a classroom will often have fluorescent lighting as well as a few incandescent spot lights when the lighting in the room is dimmed. Often, the specialty lights are left on unnecessarily when the full lights are on, wasting energy and reducing lamp life. Thus, in certain embodiments the rules based instructions can have rules such as when all fluorescent lights are on, turn off any incandescent lights. This, of course, requires that some knowledge of which lights are attached to which lighting circuits and switches 108 be available when the rules are created. In certain implementations, the user administrator can define what types of lights are attached to each circuit, switch 108, or both. In other implementations, switch 108 can actually detect what type of lamps are attached based on a combination of frequency, voltage, current, or time.

Several processors can be used to ensure that each switch 108 has the proper firmware, rules based instructions, or both. For example, in every system that uses firmware it can be preferable to be able to change the firmware remotely. One way to do is to transmit the new firmware over, e.g., the wireless interface to each switch 108. In a system such as system 100, this can be difficult because the wireless network can change or be interfered with, which will interrupt the transmission of the new firmware, which can lead to problems when the old firmware is written over with the new firmware. Accordingly, it is preferable for overwriting of firmware remotely to occur in a safe manner that is tolerant to the wireless network being interrupted.

Figure 4:
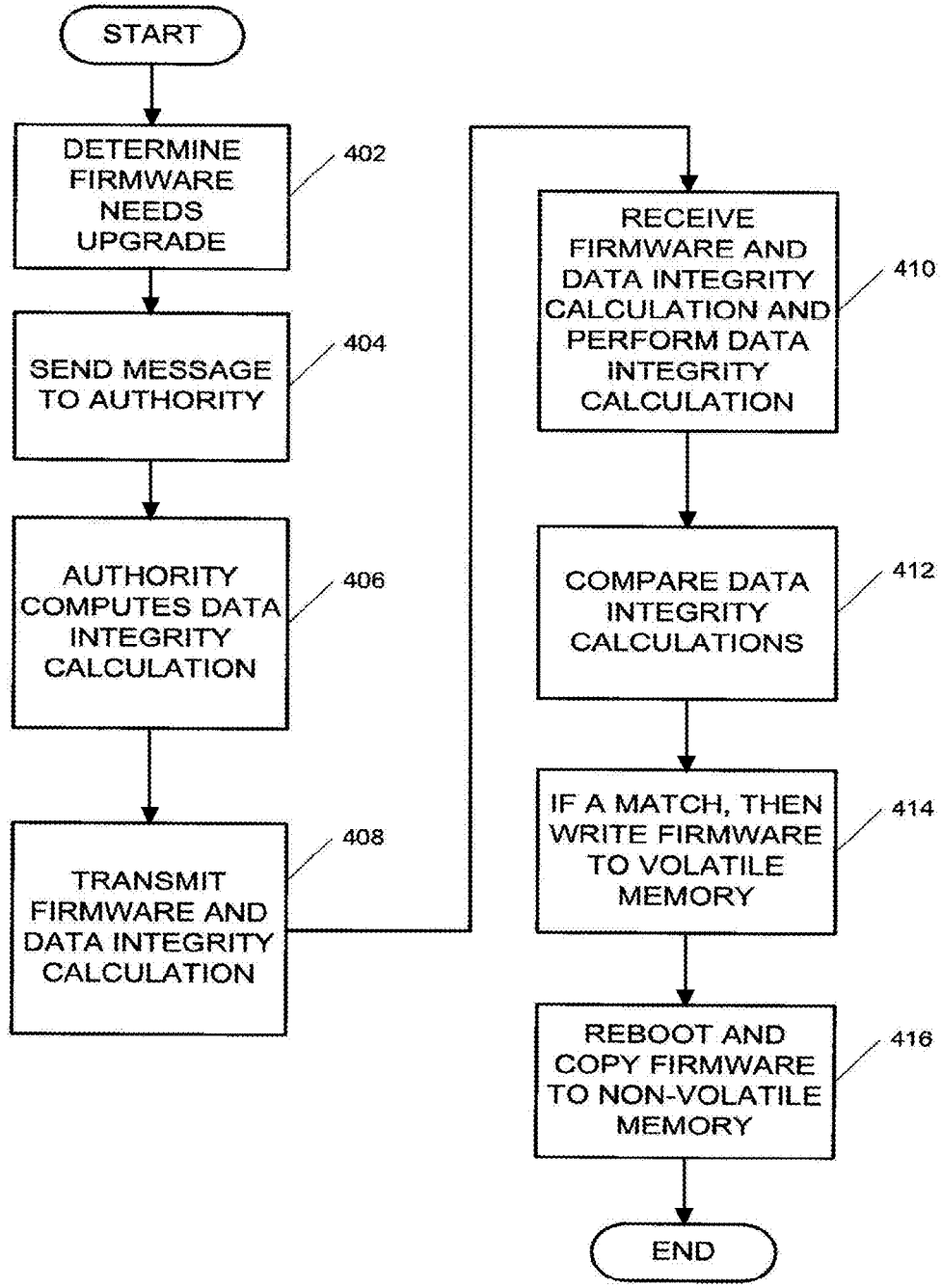
FIG. 4 is a flowchart illustrating an example process for updating the firmware in the switch of FIG. 2 in accordance with one embodiment.

FIG. 4 is a flowchart illustrating an example process for updating the firmware for switches 108 in accordance with one embodiment. First, in step 402, an intelligent switch 108 determines that it needs to update its firmware. This can be prompted either by an internal state or based on an external instruction, e.g., a message received from authority 122. In step 404, intelligent switch 108 can send a message to authority 122 indicating that it is ready for a firmware update. In step 406, authority 122 can be configured to compute a data integrity calculation on the firmware image. This data integrity calculation can be, e.g., a checksum or a hash. In one embodiment, for example, the data integrity calculation can be a hash that is computed according to the SHA-1 standard of the Internet RFC 3174. As explained below, the data integrity calculation can then be used to ensure that updated firmware is received properly by switch 108.

In step 408, authority 122 can transmit the new firmware image to switch 108 as well as the result of the data integrity calculation, e.g., the hash. In step 410, switch 108 receives the firmware image and computes the data integrity calculation. In step 412, switch 108 compares the value calculated with that received from authority 122. In step 414, if the values match, then the firmware can be written, e.g., to non-volatile memory 214 and switch 108 can re-boot itself. When the device re-boots, it can be configured to copy the new firmware image from non-volatile memory 214 in step 416.

While every endeavor can be made to ensure that the firmware on each switch 108 is reliable, inevitably there are bugs in the firmware that may cause switch 108 to become inoperable. Typically, these bugs occur more often in sub-systems of higher complexities than simpler sub-systems. For example, a bug in transceiver 204 can cause switch 108 to become inoperable. Thus, it can be preferable that switch 108 continue to function as a normal switch even if transceiver 204 fails to operate. Accordingly, switch 108 can comprise two separate processors: one that controls the basic switch functionality, and one that controls transceiver 204. In such an embodiment, when transceiver 204 receives, e.g., the command to turn off the lights, it sends its signal to processor 202 and processor 202 changes the state of circuit interrupter 222 to reduce the flow of current to the associated lighting circuit. If transceiver 204 becomes inoperable, then processor 202 continues to function and ignores transceiver 204; however, such a solution can also create issues. For example, if transceiver 204 malfunctions, it may send a command to turn off the lights without having actually received the command to do so. To avoid this problem, processor 202 can require a special sequence of commands and timing for instructions it receives from transceiver 204 before it will instruct circuit interrupter 222 to turn off or modify the lighting conditions. For example, processor 202 may require transceiver 204 to perform a sequence such as the following:

Assert signal A for 20 milliseconds and then de-assert it for 20 milliseconds;
Transmit the characters "LIGHTS ON";
Wait 20 milliseconds;
Assert signal B for 10 milliseconds;
Transmit the characters "CONFIRM";
Wait 10 milliseconds; and
De-assert signal B for 10 milliseconds.

By implementing a command sequence such as the above, processor 202 can be certain that it is receiving a valid command signal from transceiver 204.

Further, processor 202 can require that transceiver 204 send redundant commands with a certain wait period in between. For example, the wait period can be one second. Thus, if processor 202 receives two switch state change commands from transceiver 204 in less than one second, then processor 202 will know that transceiver 204 is malfunctioning. If processor 202 determines that transceiver 204 is malfunctioning, it can be configured to take one or more of the following actions: reset transceiver 204, load new firmware into transceiver 204, change the state of a visual indicator, or ignore signals from transceiver 204.

After performing one or more of the afore-mentioned actions, processor 202 can be configured to control transceiver 204 to send an error report message to authority 122. Processor 202 can also be configured to ignore transceiver 204 if the incoming data fails to meet a data security check. For example, if the data cannot be decrypted or if the data fails a checksum, then processor 202 can be configured to ignore data received from transceiver 204. In one implementation, if data received from transceiver 204 fails the encryption checksum, then processor 202 can be configured to ignore transceiver 204 until switch 108 is reset.

Because system 100 uses wireless links 116, it is important to prevent unauthorized access to the data. Accordingly, data being transmitted between switches 108 and gateway 110 should be encrypted. While there are many encryption schemes that are well known, such as Public Key Encryption (PKI), Secured Sockets Layer (SSL), and Secure Shell (SSH). These methods all require significant computational overhead. Another way to establish encryption without requiring significant computation is to set each device to a different channel; however, this is not ideal because of the finite number of channels typically available in a system 100. Thus, a hacker could simply iterate through each channel to find the channel that the system is operating on. Another method for providing encryption is to manually load a key into each device during system installation; however, this can be time consuming and is often prone to error.

Accordingly, while any of the above approaches can be used in conjunction with system 100, in certain embodiments a unique serial number and an encryption key, or device key are used for encryption. The device key can be loaded into each switch 108 as part of the manufacturing process and can also be stored within authority 122, or another server. Then during system installation, a switch 108 will request that it be able to join the network. The request can contain the switch's serial number as well as a randomly-generated number and a hash of the serial number, randomly generated number, device key, and a known text string.

As will be understood, a hash is an algorithm that generates a digital fingerprint of the information used to form the hash in such a way that it is not computationally feasible to deduce the contents of the information based on the hash value. There are many well-known hash functions that can be used in conjunction with the systems and methods described herein, including the MD5 and SHA-1 functions.

Accordingly, in such embodiments, when other devices receive information from switch 108, they will compute the value of the hash using the device key stored during manufacturing. If they match, then the switch 108 is allowed to join the network and the server uses the device key to encrypt the session key and transmit it to the device. This can be done over an insecure network because the hacker does not know the device key and he will not, therefore, be able to access the session key. The session key is then used by the different devices to communicate between each other. In one embodiment, switches 108 can be pre-loaded with the plurality of device keys that if one is compromised, then another can be used.

The process for configuring rules based instructions for a facility 102 will now be described. Authority 122 can include a server that users and administrators can sign on to create, set up, and administer a site. First, however, maps of the site or facility must be obtained. Preferably, these maps will include detail at the room-level. Intelligent switches 108 and gateway 110 can then be installed within the site and their location noted on the maps. The maps can be scanned, or otherwise turned into an image or information and then uploaded into authority 122 such that the maps can be displayed via a server. The location of the various switches and gateways can then be uploaded onto the maps as well. For example, in one implementation a server within authority 122 can be accessed in order to access the uploaded maps. Representations of each switch 108 can then be drag and drop onto the map and information such as room number; room type; e.g., classroom, hallway, office, etc.; panel supplying the circuit; circuit breaker ID in the panel; and type of circuit, e.g., fluorescent, incandescent, etc., can also be recorded for each switch once it is placed on the map. Expanders can also be placed on the map and associated with various switches 108. Similar information as that described above can also be entered for each expander. The gateway can also be placed onto the map in a similar fashion.

Certain information can also be communicated to switches 108 upon installation. For example, the associated room number can be input into the switch using an IR remote control.

When creating the new site, the administrator can log onto the server and create a site by designating a site name, a site address, a distributor, an organization, a site administrator user name and password, the number of switches included in the site, and whatever other information may be relevant.

A user associated with the site can then log on and access the site information. Various different users can be given different access rights such as none, view only, change alerts, change switch locations and configuration, and full access. Typically, the site maps will be organized in an hierarchy from the campus level to building level to floor level, which will include the individual rooms. It should also be noted, that while the switches can be placed on the maps to show their approximate location, this does not affect operation since the switches are associated with the room number and other information as described above.

The user can then establish rules based instructions that can be associated with each switch 108, each switch 108 within a certain room, each switch 108 within a certain floor, each switch 108 within a certain building, each switch 108 within a certain campus, or some combination thereof. As in the examples above, these rules based instructions can include instructions for controlling the operation of each switch 108 based on time of day, day of the week, or date; input from a motion sensor; input from a manual input associated with switch 108; temperature or other sensor input; or some combination thereof. This allows the user to establish very granular lighting control for an entire building or campus. The user can also establish various alerts such as the detection of burnt-out lamps as described below.

The rules based instructions can also control various outputs of the switches 108, such as visual and audible outputs to indicate various status conditions of each switch 108. Once the rules based instructions are downloaded and the system is up and running, the user can log onto the server and obtain information on the status of various rooms or floors within facility 102. Thus, maps illustrating the intelligent switches 108 can be presented and can allow the user to click on each switch to see the rules based instructions associated with that switch and the activity over a certain period associated with that switch. In certain embodiments, the costs savings that resulted from implementation of the rules based instructions can even be displayed to the user for each room or floor.

In order to determine how much money is being saved due to conservation as a result of the rules based instructions, and, e.g., to detect burnt-out bulbs, the current flowing through each lighting circuit must be measured using a current sensor 224. Moreover, an initial baseline current load for each intelligent switch 108 should be determined. This can be done by having someone replace all burnt-out bulbs when each switch is installed and having switch 108 provide a current measurement for the associated lighting circuit. This initial current measurement can then be used as the baseline measurement and can be used, e.g., as described below to detect burnt-out bulbs going forward. The current load information can also be used to track current loads throughout a building or campus, e.g., in order to identify problem areas that may be candidates for conservation efforts. This can allow the user to save even further on his electricity bill.

Figure 5:
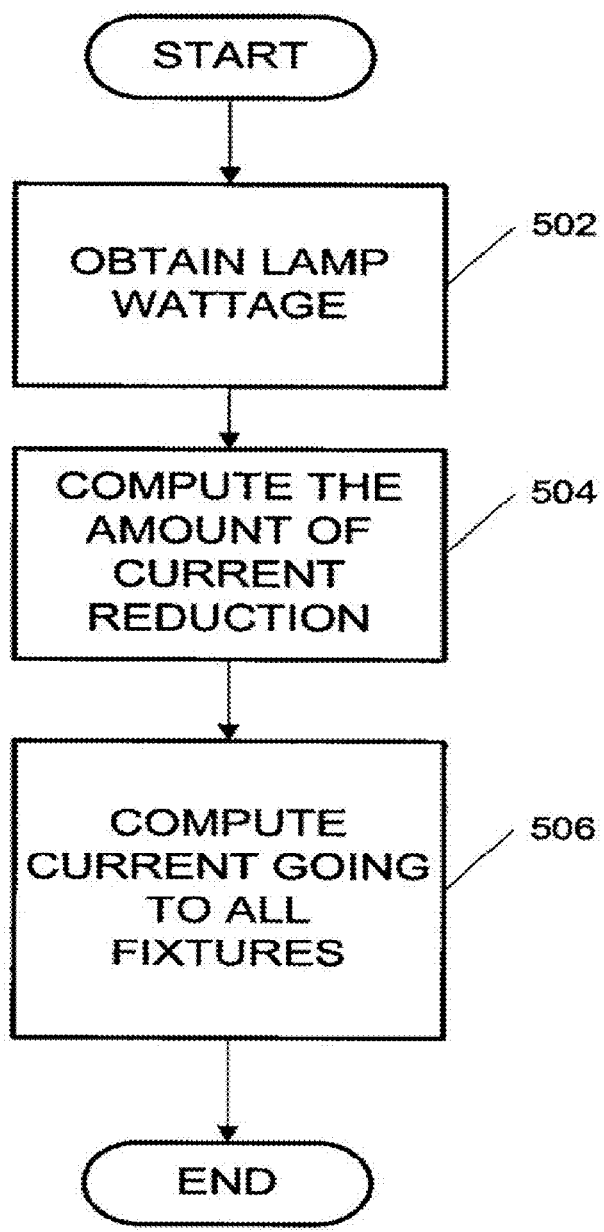
FIG. 5 is a flowchart illustrating an example process for detecting burnt-out lamps in the system of FIG. 1 using the switch of FIG. 2 according to one embodiment.

FIG. 5 is a flowchart illustrating an example process for detecting burnt-out lamps according to one embodiment. For example, fluorescent light fixtures contain lamps and ballasts, both of which burn out overtime. In large distributed facilities it is desirable to know the number of lamps, ballasts, or both that are burnt out. This allows the facility manager to schedule maintenance more efficiently and monitor the amount of lighting in each room. When a lamp or ballast burns out, the amount of current consumed by the lighting circuit is reduced. Thus, by monitoring the amount of current flowing through the lighting circuit in a room, the number of burnt-out lamps or ballasts can be computed. As explained above, a baseline current with all bulbs operational can be obtained, e.g., during site initialization. Then, in step 502, the lamp wattage of a typical lamp in, e.g., a particular room, can be obtained and stored in authority 122. For example, most lamps have this information printed on them.

Next, in step 504, the amount of current reduction that will occur when one lamp is burnt-out can be obtained by multiplying the lamp wattage by the Ballast Efficiency Factor (BEF). That BEF is computed using the following equation: (Total power and watts of all lamps connected to the ballast)/(Total power and watts that the fixture consumes on a power line). The BEF is typically the same for all fixtures with the same type of ballast. The amount of current that will be reduced when one lamp is burnt-out is the Line Power Per Lamp (LPPL).

Next, in step 506, the amount of current going to all fixtures can be measured. If one lamp is burnt-out, then this number will be the baseline minus the LPPL. If two fixtures are burnt-out, then this will be the baseline minus 2× the LPPL.

In other embodiments, it is not necessary to obtain a baseline with all bulbs replaced. Rather, each room can be left as it is found, i.e., with some burnt-out lamps, and a baseline can be obtained for that condition. The above steps will still be performed as described, but if the amount of current measured increases above the baseline, then the baseline is simply changed to the higher amount. In other embodiments, the system can be configured to memorize the load before and after a lamp is disconnected and in this way, the LPPL can be calculated empirically. In still another embodiment, each switch 108 can report the amount of current being consumed as the percentage of the baseline observed previously.

The systems and methods described herein also allow for automated load shedding. In a metropolitan electrical distribution system, it can desirable to reduce the amount of power used when energy supplies are low. This is called load shedding. Typically, load shedding is performed by the electrical utility calling a facility that uses a lot of electricity and requesting that they reduce their load. The facility manager can then turn off circuits manually to reduce the load. This manual shut-off can reduce lighting and air conditioning loads but also affects the tenants. A discounted electrical rate is often associated with the willingness to participate in load shedding; however, this process is also costly and time-consuming, and can be inconvenient or disruptive.

In most commercial facilities, light fixtures have two or more lamps in them with some lamps on one circuit and some lamps on a different circuit. This allows basic dimming, i.e., by being able to select whether all lamps are to be on or just a subset. In three-lamp light fixtures, two lamps may be on one circuit and one lamp on another circuit, and so on. The reduction in light going from three lamps down to one lamp is a substantial reduction of illumination and usually not desired by users in the space; however, the reduction in light from three lamps down to two lamps may be acceptable in times of high electricity usage.

The systems and methods described herein can be used to allow automatic load shedding. Thus, in one embodiment, when the user is configuring the system he can define which of the multiple lighting circuits is to be used for load shedding. When a central computer or user wants to enable load shedding, then the predefined lighting circuits can be turned off, thereby reducing the load but maintaining the highest possible level of lighting and convenience. In another embodiment, the user defines which circuits are in each room, and during load shedding the system can automatically determine which circuit has the least amount of current going to it and turn that circuit off. The circuit with the fewest amount of light, i.e., one as opposed to two, will draw the least amount of current. Thus, the above approach insures load shedding and minimum impact at the same time.

Because the reduction in illumination may not be acceptable to users in the room, certain embodiments allow the user to manually override the load shedding and turn the light back on. In such systems, a timer may be associated with the load shedding such that the load shedding algorithm is repeated some certain length of time after it is initially run. Thus, while users may override the load shedding initially, they may have exited the room after a certain period of time and the load shedding when run again will reduce the load.

In other embodiments, the system can detect if the circuit to be shut is the only one operational at the time. In such instances, the load shedding algorithm may not affect that circuit since all the lights will be off in the associated room. Similarly, certain embodiments can detect how many lamps are burnt out on the circuit to be left on. If the circuit to be left on has a significant number of burnt out lamps, then the load shedding algorithm can prevent the other circuit from being turned off since that may result in the room becoming acceptably dark.

Besides lighting, a facility can include certain types of devices that consume a lot of energy. For example, video projectors are used to display images from a computer or DVD or other video source. The lamps used in these projectors are very expensive to replace. In campuses and commercial buildings, these video projectors are often left on for long periods of time while the room is unoccupied, wasting energy and decreasing lamp life. In one embodiment, an intelligent switch 108 can be configured to control the video power, e.g., by turning it off at night. This can create problems in that most video projects do not function properly when power is removed because they need to run their cooling fans after the lamp is turned off. Thus, in certain embodiments, turning off the video projector can be accomplished by sending the projector a shut-down message through the projector's interface ports, or if it does not have sufficient interface ports, then through an infrared port typically used by remote control.

For example, in certain implementations a stick-on IR emitter can be used to transmit a message through the infrared port on a projector. An example of a stick-on IR emitter is the IRE-1.0 emitter from SpeakerCraft having a place of business in Riverside, Calif.

Such projectors may not actually have a shut-down command but instead a power on/off command, whereby issuing the command would cause the projector to turn off if it was on, but would cause it to turn on if it was off. Accordingly, in certain implementations, whether the projector is currently on is detected first. This can be done using several methods including measuring how much power is consumed by the projector; measuring the temperature of the exhaust port of the projector since when the projector is on, it typically exhausts hot air from the cooling lamp; and measuring the light output of the projector. The device will then transmit a message to the projector in order to turn it off if the projector is determined to be on. This message can be either pre-programmed into the device, downloaded from a remote server, or learned through a process.

One process for learning the message is as follows: Press a learn code button on the device, which will cause the device to listen on an infrared receiver, or other receivers, for a message. The projector's remote control can then be held up to the device and the power button on the remote can be pressed, and the power button or other buttons can be pressed that will cause the remote to transmit a message to the device. The device then records the message. To confirm the correct message was recorded, the user can press, e.g., a local test button. The device can then play back the memorized message to the projector, which should turn the projector off.

If the message did not perform the desired operation, then the user can erase the message using, e.g., an erased input.

Thus, the systems and methods described herein can allow for very granular, remote lighting control that is reliable and increases lighting efficiency. While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed is:

1. A lighting control system comprising a plurality of intelligent switches, each of the intelligent switches including:
   a receiver configured to receive communication signals that include rules based instructions for controlling one or more lighting circuits;
   a circuit interrupter configured to control the amount of energy flowing to a lighting circuit;
   a current sensor for detecting the presence of one or more burnt-out electrical components contained within the lighting circuit by measuring the amount of current flowing through the lighting circuit;
   a memory configured to store the rules based instructions; and
   a processor coupled with the receiver, memory, current sensor, and circuit interrupter, the processor configured to control the operation of the circuit interrupter based on the rules based instructions stored in memory.

2. The system of claim 1, wherein each of the plurality of intelligent switches further comprises a transmitter coupled with processor, the transmitter configured to transmit data related to the operation of the intelligent switch and the lighting circuit under control of the processor.

3. The system of claim 2, wherein the transmitted data includes data related to how much current is flowing through the lighting circuit.

4. The system of claim 2, wherein the receiver and transmitter are configured to send and receive signals via a wireless network.

5. The system of claim 2, wherein the receiver and transmitter are configured to send and receive signals via a main power circuit.

6. The system of claim 1, wherein one of the plurality of switches includes a receiver configured to receive the rules based instructions from a remote server, and wherein each of the plurality of switches is a node on a wireless network and is configured to communicate with each other via the wireless network.

7. The system of claim 1, wherein each of the plurality of switches is a node on a wireless network and is configured to communicate with each other and with a gateway via the wireless network.

8. The system of claim 7, wherein the wireless network is a wireless mesh network.

9. A lighting control system, comprising:
   a plurality of intelligent switches, each of the intelligent switches including:
      a receiver configured to receive communication signals that include rules based instructions for controlling one or more lighting circuits,
      a circuit interrupter configured to control the amount of energy flowing to a lighting circuit,
      a current sensor for detecting the presence of one or more burnt-out electrical components contained within the lighting circuit by measuring the amount of current flowing through the lighting circuit;
      a memory configured to store the rules based instructions, and
      a processor coupled with the receiver, memory, current sensor, and circuit interrupter, the processor configured to control the operation of the circuit interrupter based on the rules based instructions stored in memory; and
   a gateway, the gateway including:
      a first transceiver configured to communicate with a remote server in order to receive rules based instructions for control of a plurality of intelligent switches, and
      a transmitter configured to transmit the rules based instructions to the plurality of intelligent switches.

10. The system of claim 9, wherein each of the plurality of intelligent switches further comprises a switch transceiver comprising the receiver and a transmitter coupled with the processor, the transmitter configured to transmit data related to the operation of the intelligent switch and the lighting circuit under control of the processor, and wherein the gateway further comprises a second transceiver comprising the transmitter and a receiver configured to receive the data, the gateway configured to forward the data to the server via the first transceiver.

11. The system of claim 10, wherein the transmitted data includes data related to how much current is flowing through the lighting circuit.

12. The system of claim 10, wherein the switch transceiver and the second transceiver are wireless transceivers configured to send and receive data over a wireless network.

13. The system of claim 10, wherein the switch transceiver and the second transceiver are configured to send and receive signals via a main power circuit.

14. The system of claim 9, further comprising a server comprising a user interface program configured to allow a user to configured a set of rules based instructions for download to the plurality of intelligent switches, and a third transceiver configured to transmit the rules based instructions configured by the user to the gateway.

15. The system of claim 9, wherein each of the plurality of switches and the gateway are nodes on a wireless network and are configured to communicate with each other and with a gateway via the wireless network.

16. The system of claim 15, wherein the wireless network is a wireless mesh network.

* * * * *

UNITED STATES PATENT AND TRADEMARK OFFICE
CERTIFICATE OF CORRECTION

PATENT NO. : 8,299,721 B2  
APPLICATION NO. : 12/481517  
DATED : October 30, 2012  
INVENTOR(S) : Derek Matthew Smith Page 1 of 1

It is certified that error appears in the above-identified patent and that said Letters Patent is hereby corrected as shown below:

On The Title Page, Item (73)

In the Assignee name change "TELSA" to --TESLA--.

Signed and Sealed this
Twentieth Day of January, 2015

Michelle K. Lee
*Deputy Director of the United States Patent and Trademark Office*